(12) United States Patent
Horikawa et al.

(10) Patent No.: US 8,970,728 B2
(45) Date of Patent: Mar. 3, 2015

(54) IMAGE PICKUP APPARATUS AND IMAGE PROCESSING METHOD

(71) Applicant: Canon Kabushiki Kaisha, Tokyo (JP)

(72) Inventors: Yohei Horikawa, Tokyo (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 13/875,778

(22) Filed: May 2, 2013

(65) Prior Publication Data

US 2013/0308011 A1 Nov. 21, 2013

(30) Foreign Application Priority Data

May 16, 2012 (JP) ................................. 2012-112598

(51) Int. Cl.
*H04N 9/73* (2006.01)
*G03B 13/00* (2006.01)
*H04N 5/232* (2006.01)
*H04N 5/369* (2011.01)

(52) U.S. Cl.
CPC ........... *H04N 9/735* (2013.01); *H04N 5/23212* (2013.01); *H04N 5/3696* (2013.01)
USPC ..................................... 348/223.1; 348/345

(58) Field of Classification Search
USPC ............................ 348/223.1, 224.1, 345–351
See application file for complete search history.

(56) References Cited

U.S. PATENT DOCUMENTS

| | | | | |
|---|---|---|---|---|
| 2010/0097491 | A1* | 4/2010 | Farina et al. | 348/223.1 |
| 2011/0157350 | A1* | 6/2011 | Yamamoto | 348/79 |
| 2012/0025080 | A1* | 2/2012 | Liu et al. | 250/332 |
| 2012/0044400 | A1* | 2/2012 | Okada et al. | 348/333.01 |
| 2013/0083216 | A1* | 4/2013 | Jiang et al. | 348/223.1 |

FOREIGN PATENT DOCUMENTS

| | | |
|---|---|---|
| JP | 2007-133087 A | 5/2007 |
| JP | 4447520 B | 4/2010 |

* cited by examiner

*Primary Examiner* — Mekonnen Dagnew
(74) *Attorney, Agent, or Firm* — Cowan, Liebowitz & Latman, P.C.

(57) ABSTRACT

An image pickup apparatus having an obtaining unit for obtaining a pixel signal of a first image and a pixel signal of a second image having a parallax to the first image performs a position adjustment to the first and second images having the parallax, subtracts the pixel signal of the second image from the pixel signal of the first image with respect to a corresponding pixel, and obtains a specular reflection light component, thereby specifying light source color.

5 Claims, 8 Drawing Sheets

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

IMAGE PICKUP APPARATUS AND IMAGE PROCESSING METHOD

BACKGROUND OF THE INVENTION

1. Field of the Invention

The present invention relates to an image pickup apparatus and an image processing method and, more particularly, to an image pickup apparatus and an image processing method for detecting a light source color by an image signal processing.

2. Description of the Related Art

Among image pickup apparatuses represented by a digital camera, there is an image pickup apparatus having a function for adjusting a white balance in such a manner that white images illuminated by various light sources can be picked up as images of a corrected white color.

As a white balance adjusting method in the related art, as shown in the Official Gazette of U.S. Pat. No. 4,447,520 (Patent Literature 1), there has been known such a technique that a difference between a pixel value which is brighter than an average of an image and a pixel value which is darker than the bright pixel value is used as specular reflection light, and a light source color is estimated based on the difference to obtain a white balance gain so that the light source color approaches a white color.

On the other hand, as shown in the Official Gazette of Japanese Patent Application Laid-Open No. 2007-133087 (Patent Literature 2), there has been known such a technique that an image pickup element having a construction in which one pixel corresponding to one microlens (hereinbelow, referred to as ML) has a plurality of divided photoelectric conversion units (hereinbelow, referred to as PDs) is used to obtain images passing through exit pupils of different positions. The operation for obtaining the images passing through the exit pupils of the different positions and the operation for obtaining images of different parallaxes are the operations having substantially the same meaning.

However, according to the method of Patent Literature 1, since the difference between the bright pixel value and the dark pixel value is used as specular reflection light, there is such a problem that if an edge of radiance exists in a texture of an object, the specular reflection light is erroneously detected and the light source color is determined as a color which is not an inherent light source color.

It is, therefore, an aspect of the invention to provide an image pickup apparatus and an image processing method in which by using images with a parallax, a light source color can be accurately determined irrespective of a texture of an object.

SUMMARY OF THE INVENTION

According to an aspect of the invention, there is provided an image pickup apparatus comprising: an obtaining unit configured to obtain a pixel signal of a first image and a pixel signal of a second image having a parallax to the first image; a position adjustment unit configured to perform a position adjustment such that a parallax between an image area for specifying a light source colors of the first image and an image area for specifying a light source color of the second image is eliminated; a comparison unit configured to compare the pixel signal of the first image and the pixel signal of the second image, subjected to the position adjustment by the position adjustment unit; and a light source color specifying unit configured to specify the light source colors on the basis of a result of the comparison performed by the comparison unit.

According to another aspect of the invention, the comparison unit is a subtraction unit configured to obtain a difference value between the pixel signal of the first image and the pixel signal of the second image, and the light source color specifying unit specifies the light source color on the basis of the difference value in the image areas between which there is no parallax due to the position adjustment by the position adjustment unit.

According to still another aspect of the invention, the image pickup apparatus further comprises: an image pickup element having an image pickup pixel having a plurality of photoelectric conversion units; and a focus adjustment unit configured to perform a focus adjustment of a phase-difference detection method by using a pair of images detected by the plurality of photoelectric conversion units, wherein the pair of images are the first image and the second image.

According to further another aspect of the invention, the obtaining unit obtains information of in-focus ranges of the first image and the second image, and the light source color specifying unit specifies the light source color on the basis of the information of the in-focus ranges.

According to further another aspect of the invention, the position adjustment unit obtains a parallax amount by a correlation operation of the first image and the second image.

According to further another aspect of the invention, the image pickup apparatus further comprises a white balance correction unit configured to perform a white balance correction on the basis of the light source color specified by the light source color specifying unit.

According to further another aspect of the invention, there is provided an image processing method comprising: an obtaining step of obtaining a pixel signal of a first image and a pixel signal of a second image having a parallax to the first image; a position adjustment step of performing a position adjustment such that a parallax between image areas for specifying a light source colors of the first image and the second image is eliminated; a comparison step of comparing the pixel signal of the first image and the pixel signal of the second image, subjected to the position adjustment in the position adjustment step; and a light source color specifying step of specifying the light source color on the basis of a result of the comparison performed in the comparison step.

According to the invention, by obtaining the difference value between the images with the parallax, the light source color can be desirably specified irrespective of the texture of the object.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Exemplary embodiments of the invention will be described in detail hereinbelow with reference to the drawings.

First Embodiment

Figure 1:
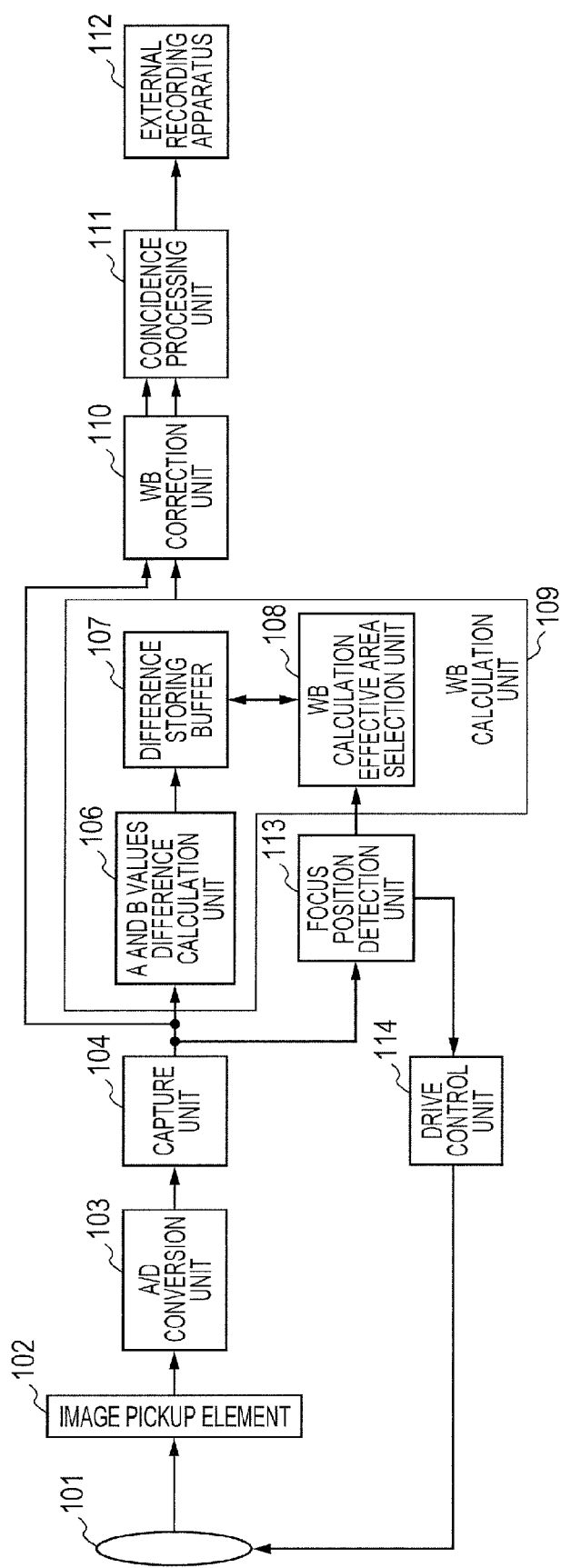
FIG. 1 is a block diagram illustrating a schematic construction of an image pickup apparatus according to the first embodiment of the invention.

FIG. 1 is a block diagram illustrating a construction of an image pickup apparatus according to the first embodiment of the invention. The operation of each block constructing the image pickup apparatus illustrated in the diagram is controlled by a control unit (not shown). The control unit is constructed so as to effect control by loading and executing a program stored in a memory (not shown).

In the diagram, an optical system unit 101 is constructed with an optical lens group including a focusing lens for adjusting a focus (in-focus state), a shutter, an iris, a lens control unit, and the like, and is driven on the basis of an output of a drive control unit 114, which will be described hereinbelow.

The drive control unit 114 outputs a signal for driving the focusing lens included in the optical system unit 101 in accordance with an output from a focus position detection unit 113, which will be described hereinbelow.

An image pickup element 102 is an image pickup element in which unit pixel cells are arranged in a 2-dimensional matrix shape as which will be described hereinafter. An exposure amount is controlled by a shutter included in the optical system unit 101. At the time of read-out control, charges accumulated in a plurality of divided PDs constructed in the unit pixel cell are sequentially read out.

The unit pixel cell of the image pickup element will now be described with reference to FIG. 2.

Figure 2:
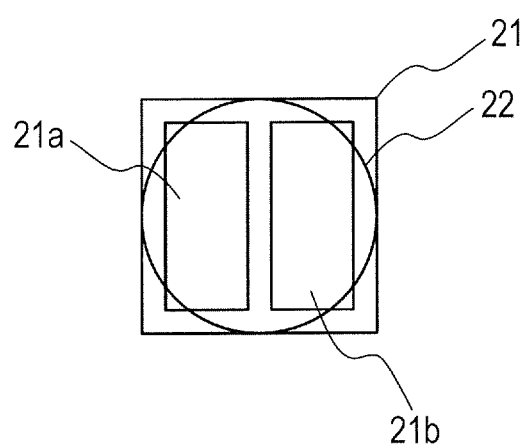
FIG. 2 is a diagram schematically illustrating a unit pixel cell of an image pickup element which is used in the image pickup apparatus in FIG. 1.

In FIG. 2, a unit pixel cell 21 constructs a pixel array of the image pickup element. The unit pixel cell 21 has pixels 21a and 21b each including the PDs which share an ML and a color filter ML2.

The pixels 21a and 21b are divided PDs which receive incident light through the same ML2. Outputs of the respective divided PDs can be used as pixels of A- and B-image which are pupil-divided in accordance with the layout of the PDs.

Figure 7:
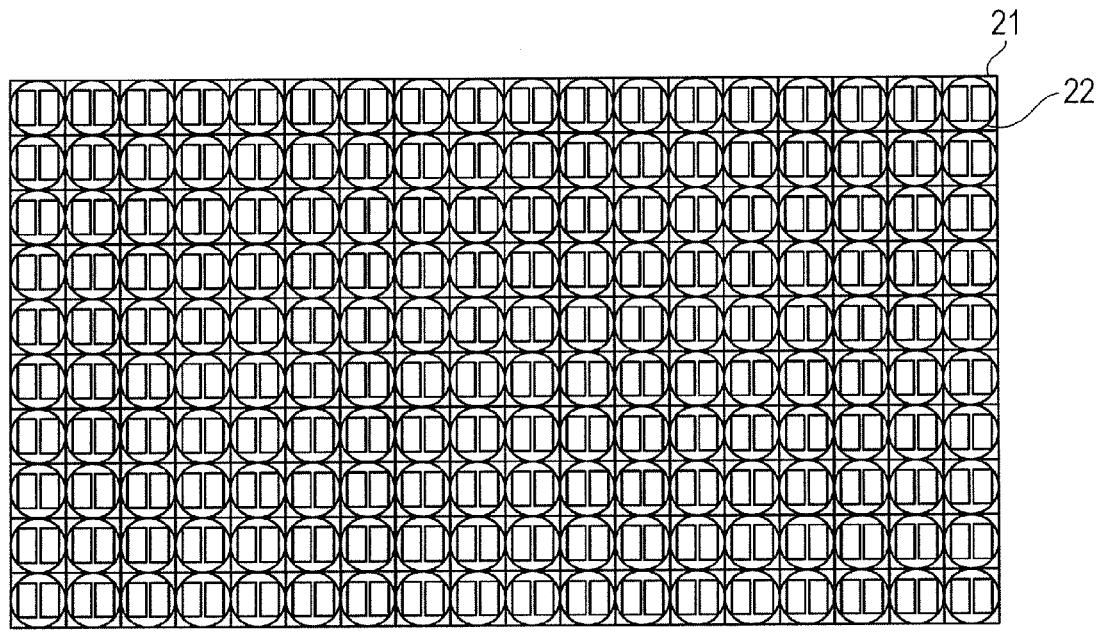
FIG. 7 is a diagram schematically illustrating a pixel array of an image pickup element which is used in the image pickup apparatus illustrated in FIG. 1.

The image pickup element which is used in the present embodiment has such a construction that the above-described unit pixel cells are repeatedly arranged in accordance with the Bayer array as illustrated in FIG. 7. The image pickup element outputs pixel signals having color information of first and second images. The first and second images are pixel signals which are output from a first divided pixel group and a second divided pixel group serving as arrays of the pixels 21a and 21b, respectively.

An A/D conversion unit 103 converts an analog electric signal which is output from the image pickup element 102 after an analog signal processing is executed by an analog signal processing unit (not shown) into a digital electric signal (pixel signal) and outputs to a capture unit 104.

The analog signal processing unit is a CDS (Correlated Double Sampling) circuit for removing noises on a transmission path, a non-linear amplification circuit, or the like.

The capture unit 104 discriminates effective periods and types of the pixel signals and outputs the A-image pixel signal and the B-image pixel signal to a WB calculation unit 109 and the focus position detection unit 113.

Figures 4, 5:
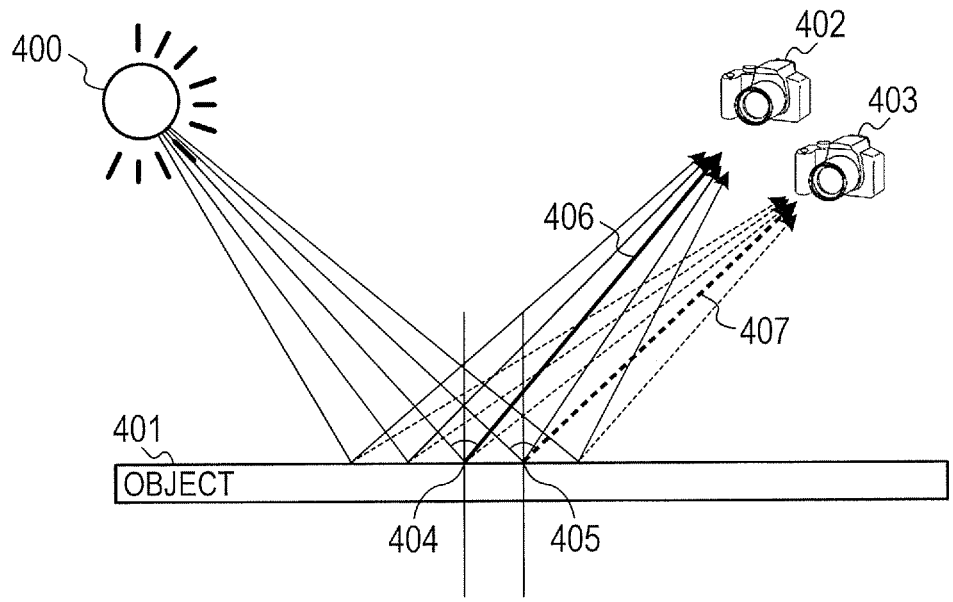
FIG. 4 is a diagram for describing an obtaining principle of specular reflection light according to the invention.
FIG. 5 is a diagram conceptually illustrating an image division which is performed when executing the focusing operation and the light source color estimating operation.

As illustrated in FIG. 5, the focus position detection unit 113 divides one image into a plurality of blocks 1 to 64 and executes a correlation operation of the image A and the image B (the first image and the second image) of each divided block.

A defocus amount is obtained from an obtained result of the correlation operation and is allocated to each divided block, thereby making the drive control unit 114 operative on the basis of the defocus amount in such a manner that the divided block existing in an area selected by a user input unit (not shown) goes into an in-focus state.

At the same time, the number of the block having a value close to the defocus amount of the selected divided block is output to the WB calculation unit 109.

A distance measurement information obtaining operation of the image pickup apparatus using the images A and B will now be described with reference to FIGS. 3A to 3C.

Figure 3A:
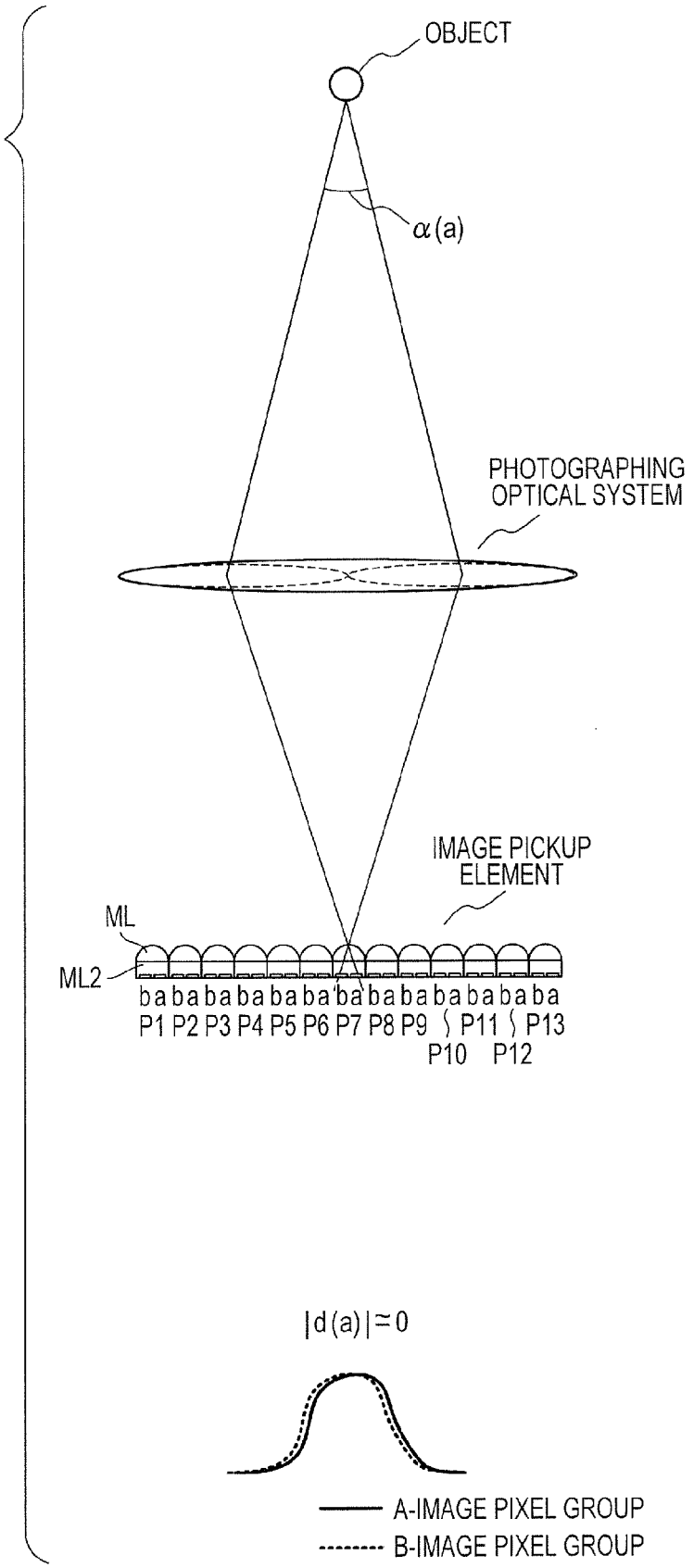
FIGS. 3A, 3B and 3C are diagrams schematically illustrating the focusing operation using pixel values of divided PDs in the unit pixel cell illustrated in FIG. 2.
Figure 3B:
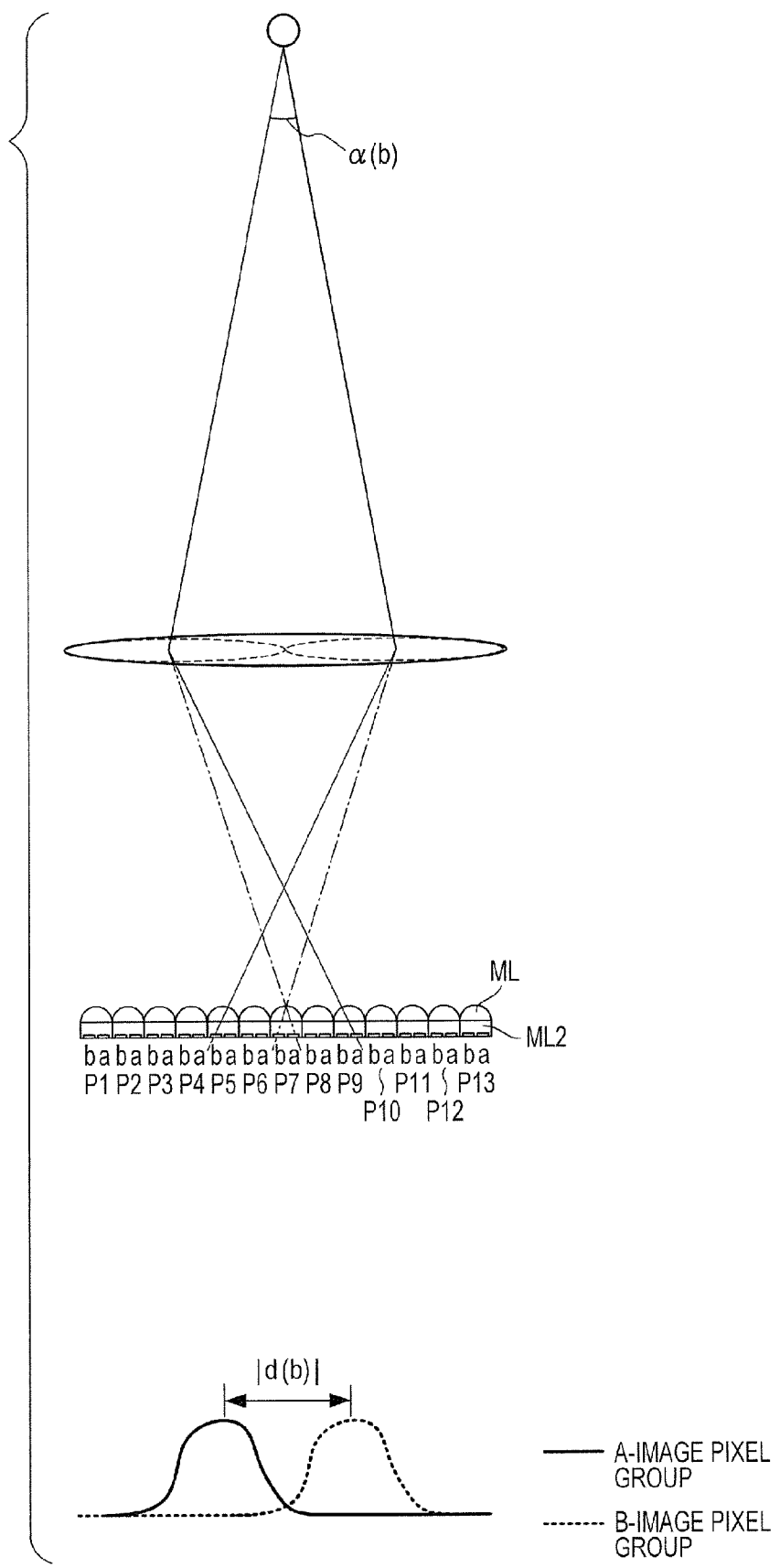
Figure 3C:
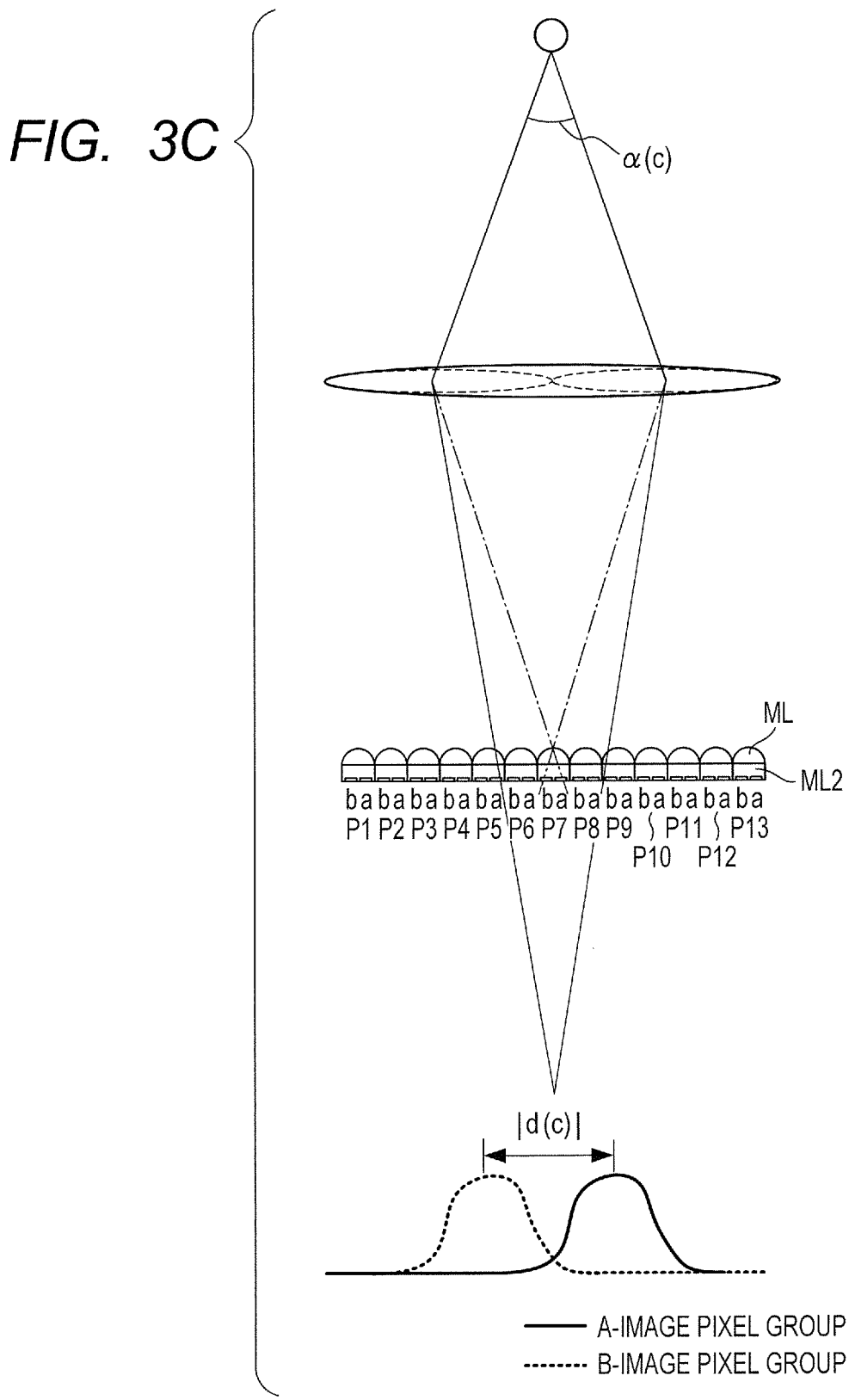

In an image pickup element illustrated in FIGS. 3A to 3C, a plurality of unit pixel cells P having pixels a and b discretely arranged under one ML are arranged. A fact that the pixels a and b arranged under one ML are pixels in which the ML is pupil-divided as exit pupils is well-known by Patent Literature 2.

At the time of the distance measurement, the outputs of the A-image pixel and the B-image pixel constructed by the pixels a and b are combined in the column direction (or the row direction), data of the images A and B are generated as outputs of the unit pixel cell groups of the same color, and a deviation between corresponding points of the images is obtained by a correlation operation. A result of the correlation operation is obtained by the following equation (1).

$$C=\Sigma|YAn-YBn| \qquad (1)$$

where, n denotes the number of horizontal microlenses. Values which are obtained when the corresponding pixel is shifted for YBn are plotted and a shift amount of the smallest value indicates the in-focus position. A relation between a shift amount (parallax amount) and the in-focus state is shown at the lower stage of each of FIGS. 3A to 3C.

In the in-focus state of FIG. 3A, since a position where the photographing optical system is focused is set to the PD under ML at P7, the A-image pixel group and the B-image pixel group almost coincide. At this time, it is shown that an image shift amount d(a) between the A-image pixel group and the B-image pixel group which is obtained by the correlation operation is approximated to 0.

In the state of FIG. 3B in which a focal point of the object is on the opposite side of the image pickup plane, as a position where the photographing optical system is focused, the A-image pixel becomes the pixel under ML of P5 and the B-image pixel becomes the pixel under ML of P9. At this time, an image shift amount d(b) between the A-image pixel group and the B-image pixel group which is obtained by the correlation operation appears.

In the state of FIG. 3C in which a focal point of the object is on the object side of the image pickup plane, as a position where the photographing optical system is focused, the A-image pixel becomes the pixel under ML of P9 and the B-image pixel becomes the pixel under ML of P5. At this time, as an image shift amount between the A-image pixel group and the B-image pixel group which is obtained by the correlation operation, an image shift amount d(c) in the direction opposite to that in the state of FIG. 3B in which a focal point of the object is on the opposite side of the image pickup plane appears.

This means that although the A- and B-image pixel groups view the same object in the in-focus state, in the state in which a focal point of the object is on the opposite side of the image pickup plane and in the state in which a focal point of the object is on the object side of the image pickup plane, the A- and B-image pixel groups view the objects which are shifted only by a distance corresponding to an image shift amount d.

At the time of the actual focusing operation, the defocus amount which is obtained from the image shift amount d and a baseline length by a well-known technique is output to the drive control unit 114 to move the photographing optical system, thereby executing the focusing operation to the object.

The WB calculation unit 109 has an A and B values difference calculation unit 106, a difference storing buffer 107, and a WB calculation effective area selection unit 108. Thus, light source colors of the A- and B-image pixels are estimated, the effective light source color is selected on the basis of an output of the focus position detection unit, and the specified light source color is output to a WB correction unit 110.

A construction of each of the foregoing units will be specifically described hereinbelow.

The A and B values difference calculation unit 106 obtains the A- and B-image pixel signals which are output from the capture unit 104 and obtains a difference between the divided PDs existing under the same ML. The obtained difference value is estimated as a light source color, is integrated every divided block, and is output as a WB evaluation value to the difference storing buffer 107.

A principle of an estimating method of the characteristic light source color of the invention will now be described.

Two kinds of reflection light called "diffused reflection light" which reflects the color of a substance and does not have a reflection directivity and "specular reflection light" which does not reflect the color of a substance but reflects the light source color exist in the reflection light of a substance.

Characteristics of the reflection light will be specifically described with reference to FIG. 4.

Image pickup apparatuses 402 and 403 pick up images of an object 401 from spatially different positions. The object 401 reflects light irradiated from a light source 400 as "diffused reflection light" and "specular reflection light".

At this time, the light which is reflected in the direction of the image pickup apparatus 402 is shown by solid lines and the light which is reflected in the direction of the image pickup apparatus 403 is shown by broken lines, respectively.

The diffused reflection light reflects the light from the light source and shows the color of the object. This reflection light does not change even if the object is picked up from different positions.

As for the specular reflection light, when an angle of incidence and an angle of reflection are equal (regular reflection), the light of the light source is reflected most strongly as specular reflection light. For example, at a point 404, the light of the light source is reflected as a component of reflection light 406 to the image pickup apparatus 402, and at a point 405, it is reflected as a component of reflection light 407 to the image pickup apparatus 403. On the contrary, the reflection light at the point 404 which enters the image pickup apparatus 403 is almost only the diffused reflection light. This is true of the reflection light at the point 405 which enters the image pickup apparatus 402.

That is, as for the specular reflection light, even at the same position, a light amount which is measured changes in dependence on the spatial position of the image pickup apparatus.

The reflection light which is obtained when assuming that the colors at the point 404 which are measured from the image pickup apparatuses 402 and 403 are set to A1 and A2, can be described as shown by the following equations (2) and (3).

$$A1 = I1 + D \tag{2}$$

$$A2 = I2 + D \tag{3}$$

where, I1 denotes specular reflection light which enters the image pickup apparatus 402 from the point 404, I2 denotes specular reflection light which enters the image pickup apparatus 403, and D denotes diffused reflection light. The diffused reflection light D is not influenced by the positions of the image pickup apparatuses 402 and 403 and can be assumed as being almost same because of the same position of the object.

I1 and I2 are obtained by an Ohong's reflection model by the following equations (4) and (5).

$$I1 = iW(\alpha)\cos\theta 1 \tag{4}$$

$$I2 = iW(\alpha)\cos\theta 2 \tag{5}$$

where, i denotes an intensity of the incident light, $W(\alpha)$ denotes a specular reflectance in the regular reflecting direction of the object, $\theta 1$ and $\theta 2$ denote shift angles of the image pickup apparatuses 402 and 403 from the regular reflecting direction. Since i denotes the same light which is irradiated from the light source 400 and $W(\alpha)$ denotes the reflectance at the same position of the object, $W(\alpha)$ is not influenced by the positions of the image pickup apparatuses 402 and 403 and can be assumed as being almost same.

Since $\theta 1$ and $\theta 2$ change in dependence on the positions of the image pickup apparatuses, this means that a value of $\cos \theta$ changes in spite of the same point in the images picked up from the image pickup apparatuses 402 and 403.

By calculating a difference between A1 and A2 from the above equations, the following equation (6) is obtained.

$$A1 - A2 = iW(\alpha)(\cos\theta 1 - \cos\theta 2) \tag{6}$$

It will be understood from the equation (6) that the reflection light at the point 404 which is measured from the image pickup apparatuses 402 and 403 of the spatially different positions is multiple times as large as the incident light. That is, this means that the same characteristics as those of the incident light are obtained from a value of (A1−A2).

According to a result of the equation (6), since the same characteristics are obtained irrespective of the color, the color characteristics of the incident light from the light source color can be obtained by similarly obtaining a difference between the colors.

Although a case of obtaining the images A and B by using the two image pickup apparatuses has been described above for convenience of explanation, similar characteristics are also obtained from images A and B having a parallax which are obtained by using the image pickup element of the present embodiment.

Since the reflection light is obtained by the addition of the specular reflection light and the diffused reflection light as shown in the equations (2) and (3), the reflection light has such characteristics that it is brighter than the portion of the object where only the diffused reflection light exists. When a subtraction processing is executed, the subtraction may be executed only to a partial or divided block of the object which is brighter than an average value of the reflection light.

The WB calculation effective area selection unit 108 selects the in-focus block among the divided blocks on the basis of an output of the focus position detection unit 113 and outputs a signal showing the divided block which can be used as a WB evaluation value to the difference storing buffer 107.

At this time, as a divided block which can be used as a WB evaluation value, a divided block including only the focused image is desirable.

The reasons why the divided block of the focused image area is used as a WB evaluation value will be described with reference to FIGS. 6A and 6B.

Figure 6A:
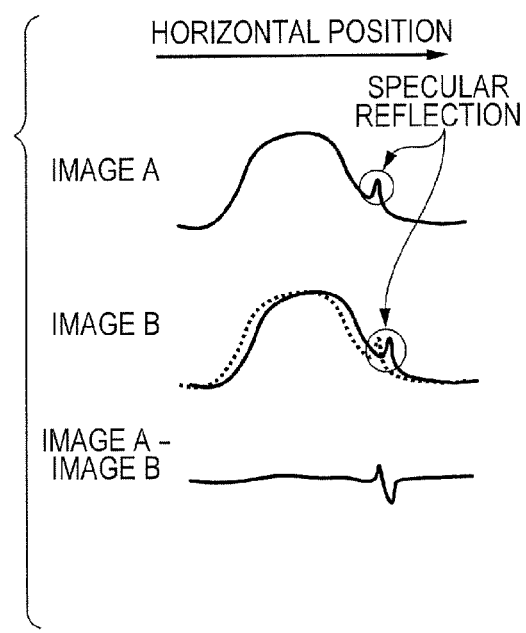
FIGS. 6A and 6B are diagrams illustrating a concept regarding a separation of the specular reflection light in an in-focus state.
Figure 6B:
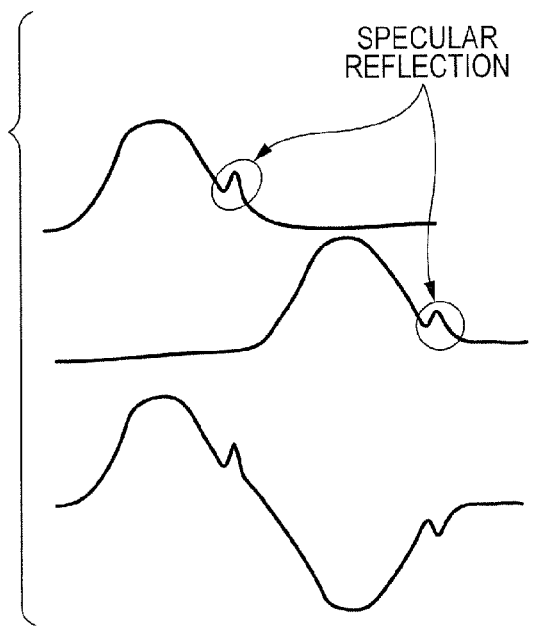

In the diagrams, FIG. 6A illustrates images A and B having a parallax in the in-focus state and (image A−image B) as a result of the correlation operation, and FIG. 6B illustrates the images in a defocus state. In FIGS. 6A and 6B, an axis of abscissa indicates a horizontal position and an axis of ordinate indicates a value of each pixel.

In FIG. 6A, since the object is in an almost in-focus state, almost the same value can be obtained for the images A and B. That is, in the (image A−image B), a difference value at a position where the specular reflection light component hardly exists is near 0 and a difference value in a portion where a large amount of specular reflection light is included is large.

In FIG. 6B, since the object is not in the in-focus state, the images A and B are largely shifted as described with reference to FIGS. 3A to 3C and, in the (image A−image B), it is difficult to separate the specular reflection light component from the difference value.

It will be understood from FIGS. 6A and 6B that in the case of the divided block of the in-focus image area, the specular reflection light can be desirably obtained.

When the image pickup apparatus having two optical systems is used, it is desirable to obtain a difference of areas where the images A and B hardly have a parallax (coincide) exclusive of discrimination about whether or not they are in the in-focus state.

With the construction of the present embodiment mentioned above, the specular reflection light from the light source can be desirably extracted and the proper WB evaluation value can be obtained.

As for the images A and B according to the invention, it is sufficient to use images having a parallax and, for example, the images A and B may have a parallax due to a movement parallax. They also may be the images obtained by the image pickup units having individual optical systems.

In the present embodiment, although the focusing processing is executed so that the image shift amount is eliminated in order to extract the specular reflection light of the images A and B, it is sufficient to obtain a difference value in a state where the image shift amount is small as shown by a broken line in FIG. 6A. For example, it is possible to construct in such a manner that a position of the image having a high contrast is estimated as an in-focus range in advance, a processing is executed so that the shift amount between the images A and B is eliminated, and thereafter, the specular reflection light is extracted.

It is also possible to construct in such a manner that a range where the images A and B coincide is stored in the image pickup apparatus in advance and when a post-processing of the image is executed by a computer, the specular reflection light is obtained from a difference value of the coincidence range.

It is also possible to construct in such a manner that even if the focusing processing is not executed, the position adjustment is performed so that the shift amount between the images A and B is eliminated on an arithmetic operation on the basis of the shift amount (for example, on the basis of a defocus map), and then the specular reflection light is extracted. At this time, in the arithmetic operation processing at the time of executing the focusing processing, in the case of obtaining the image shift amount from the difference value between the images A and B, the difference value which is obtained at the time when the image shift amount is smallest is set as the specular reflection light, thereby allowing the focus position detection unit 113 to also function as a WB calculation unit 109. In this case, since not only the apparatus can be simplified but also the WB correction can be performed simultaneously with the execution of the focusing processing, the processing speed can be raised.

Subsequently, a construction in which the WB is performed by using the WB evaluation value obtained on the basis of the obtained specular reflection light will be described.

The difference storing buffer 107 stores the WB evaluation value which is input from the A and B values difference calculation unit 106. The effective WB evaluation value is selected on the basis of an output from the WB calculation effective area selection unit 108. With respect to the selected WB evaluation value of each divided block, a color component is normalized and a resultant value is output to the WB correction unit 110.

When the color component is normalized, the WB evaluation value of each divided block may be corrected to a color tone near a black body radiation.

The WB correction unit 110 forms an image pickup pixel by adding the A- and B-image pixels which are output from the capture unit 104, multiplies each color of R, G, and B by a correction value on the basis of the WB evaluation value which is input from the WB calculation unit 109, and outputs a resultant value as a corrected image pickup pixel to a coincidence processing unit 111.

For example, when the WB correction is performed by using G among R, G, and B as a reference, an R correction value GainR and a B correction value GainB can be obtained by the following equations (7) and (8).

$$\mathrm{Gain}R = GL/RL \quad (7)$$

$$\mathrm{Gain}B = GL/BL \quad (8)$$

At this time, WB evaluation values serving as light source colors of R, G, and B are equal to RL, GL, and BL.

The coincidence processing unit 111 executes a coincidence processing of the corrected image pickup pixel which is input, at the same time, performs a noise reduction and an image compression represented by JPEG (not shown), and thereafter, outputs a resultant value to an external recording apparatus 112.

The external recording apparatus 112 records an image which is output from the coincidence processing unit 111 into a memory card represented by an SD card or the like.

As mentioned above, according to the invention, by obtaining the difference value of the same object portion between the images A and B having the parallax, the light source colors can be accurately determined irrespective of the texture of the object.

Second Embodiment

In the first embodiment of the invention, the estimating construction of the light source colors of the invention has been described as an image processing apparatus in the image pickup apparatus.

However, the invention is not limited to the image processing in the image pickup apparatus. As a second embodiment, the invention can be also embodied as an image processing construction including the estimation of the light source color in the image processing apparatus using a computer. In this case, the invention is realized by a method whereby a CPU of a computer loads a program from a memory held in the computer or a memory loaded therein and executes it.

Figure 8:
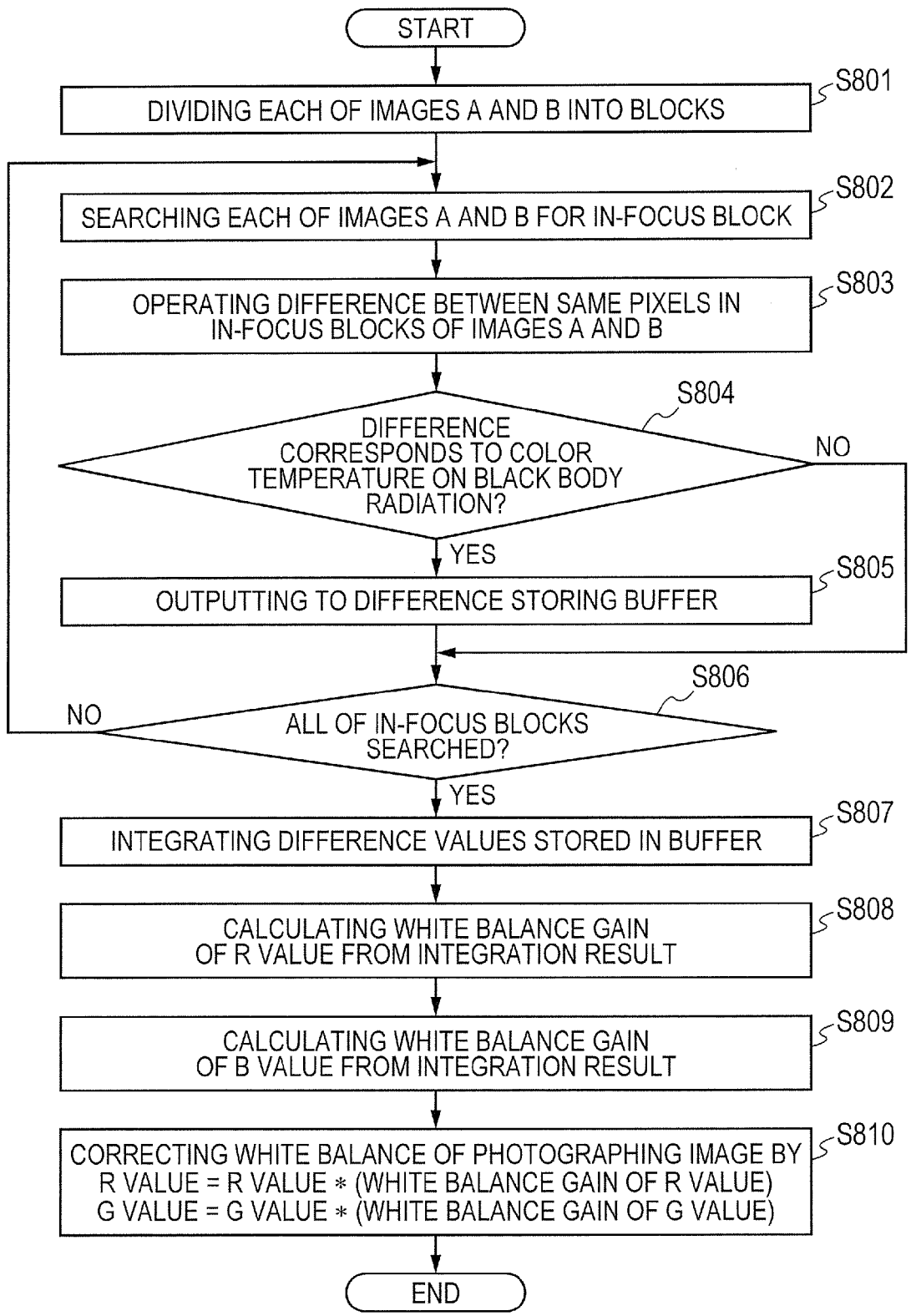
FIG. 8 is a diagram illustrating a flowchart for the image processing operation according to the second embodiment of the invention.

FIG. 8 is a diagram illustrating a flowchart for the image processing operation including the estimation of the light source colors according to the second embodiment.

In step S801, a control unit including the CPU of a signal processing apparatus (hereinbelow, simply referred to as a signal processing apparatus) obtains the images A and B having the parallax from a storage medium or the like and divides into blocks in a manner similar to the first embodiment.

In step S802, the signal processing apparatus searches each of the photographed images A and B for in-focus blocks. In step S803, a difference value between the corresponding pixels in the searched in-focus blocks of the images A and B is obtained.

In step S804, the signal processing apparatus discriminates whether or not the difference value obtained in step S803 is equal to a value which can be distributed to a color temperature on the black body radiation. If the difference value can be distributed to the color temperature on the black body radiation, the processing routine advances to step S805. If it cannot be distributed, it is determined that the difference value is not a value due to the specular reflection light. The output into the difference storing buffer in step S805 is not executed but the processing routine advances to step S806. This is because it is necessary to consider not only a case where the difference value between the images A and B is not actually the value due to the specular reflection light but is the value due to the difference value by what is called an occlusion area. Specifically speaking, a difference between the difference value obtained in step S803 and the color temperature on the black body radiation is obtained and when it is smaller than a set value, it is determined that the difference value can be distributed, that is, it is determined that the light source color is an effective light source color.

In step S805, the signal processing apparatus outputs the difference value between the images A and B to the difference storing buffer. This difference storing buffer is a buffer for storing the difference value between the images A and B as a component of the effective specular reflection light.

In step S806, the signal processing apparatus discriminates whether or not the search of all of the in-focus blocks in the photographed images has been completed. If it is not completed, the processing routine is returned to step S802. If it has been completed, step S807 follows.

In step S807, the signal processing apparatus integrates the difference value in the difference storing buffer as effective specular reflection light. Then, step S808 follows.

In step S808, the signal processing apparatus obtains a white balance gain of the R value from an integration value obtained in step S807 in a manner similar to the first embodiment. Then, step S809 follows.

In step S809, a white balance gain of the B value is similarly obtained from the integration value obtained in step S807 and step S810 follows.

In step S810, the signal processing apparatus multiplies the photographed images by the white balance gains of the R value and the B value obtained in steps S808 and S809, thereby performing the white balance correction and completing the WB.

By executing the processings as mentioned above, the invention in the signal processing apparatus can be embodied and a technical effect similar to that in the first embodiment can be obtained.

The functions of the processing operations shown in the foregoing embodiments are realized by a method whereby a CPU of the image pickup apparatus or the signal processing apparatus reads out a program for realizing the functions of the processings from a memory and executes the program.

The invention is not limited to the foregoing construction but all or a part of the functions of the processings may be realized by dedicated hardware. The foregoing memory may be constructed by: a magnetooptic disk apparatus; a non-volatile memory such as flash memory or the like; a read only recording medium such as a CD-ROM or the like; or a volatile memory other than a RAM. The foregoing memory may be constructed by a computer-readable and writable recording medium by a combination of them.

The processings may be executed by a method whereby the program for realizing the functions of the processings is recorded into the computer-readable recording medium, the program recorded in the recording medium is read out and stored into a computer system, and the program is executed. It is assumed that "computer system" mentioned here incorporates an OS or hardware such as peripheral equipment or the like. Specifically speaking, the invention also incorporates a case where a program read out of a storage medium is written into a memory provided for a function expanding board inserted in a computer or a function expanding unit connected to the computer, thereafter, a CPU or the like provided for the function expanding board or the function expanding unit executes a part or all of actual processings on the basis of instructions of the program, and the functions of the embodiments mentioned above are realized by those processings.

"computer-readable recording medium" denotes a storing apparatus such as portable medium like a flexible disk, a magnetooptic disk, a ROM, a CD-ROM, or the like, hard disk built in the computer system, or the like. Further, it is assumed that "computer-readable recording medium" incorporates a medium which holds the program for a predetermined time. For example, it is a volatile memory (RAM) in the computer system serving as a server or a client in the case where the program has been transmitted through a network such as Internet or the like or a communication line such as a telephone line or the like.

The foregoing program may be transmitted from the computer system in which the program has been stored in the storing apparatus or the like to another computer system through a transmission medium or by a transmission wave in the transmission medium. "transmission medium" for transmitting the program denotes a medium having an information transmitting function such as network (communication network) like Internet or the like or communication line (communication wire) like a telephone line or the like.

The foregoing program may be a program for realizing a part of the foregoing functions. Further, the foregoing program may be a program which can be realized by a combination with a program in which the foregoing functions have already been recorded in the computer system, that is, a differential file (differential program).

A program product such as a computer-readable recording medium or the like in which the foregoing program has been recorded can be also applied as an embodiment of the invention. The foregoing program, recording medium, transmission medium, and program product are incorporated in the purview of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-112598 filed on May 16, 2012, which is hereby incorporated by reference herein in its entirety.

What is claimed is:

1. An image pickup apparatus comprising:
an image pickup element having an image pickup pixel having a plurality of photoelectric conversion units;
an obtaining unit configured to obtain a pixel signal of a first image and a pixel signal of a second image having a parallax to the first image, from an output of the image pickup element;
a focus adjustment unit configured to perform a focus adjustment of a phase-difference detection method by using a pair of the first image and the second image;
a position adjustment unit configured to perform a position adjustment such that a parallax between an image area for specifying a light source color of the first image and an image area for specifying a light source color of the second image is eliminated;
a comparison unit configured to compare the pixel signal of the first image and the pixel signal of the second image, subjected to the position adjustment by the position adjustment unit; and
a light source color specifying unit configured to specify the light source color on the basis of a result of the comparison performed by the comparison unit,
wherein the comparison unit is a subtraction unit configured to obtain a difference value between the pixel signal of the first image and the pixel signal of the second image, and the light source color specifying unit is arranged to specify the light source color on the basis of the difference value in the image areas between which there is no parallax due to the position adjustment by the position adjustment unit,
wherein the obtaining unit obtains information of in-focus ranges of the first image and the second image, and the light source color specifying unit is arranged to specify the light source color on the basis of the information of the in-focus ranges, and
wherein the comparison unit compares the pixel signals of the first and second image of a same spectrum characteristic.

2. An apparatus according to claim 1, wherein the position adjustment unit obtains a parallax amount by a correlation operation of the first image and the second image.

3. An apparatus according to claim 1, further comprising:
a white balance correction unit configured to perform a white balance correction on the basis of the light source color specified by the light source color specifying unit.

4. An image processing method comprising:
an obtaining step of obtaining a pixel signal of a first image and a pixel signal of a second image having a parallax to the first image, from an output of the image pickup element having an image pickup pixel having a plurality of photoelectric conversion units;
a focus adjusting step of performing a focus adjustment of a phase-difference detection method by using a pair of the first image and the second image;
a position adjustment step of performing a position adjustment such that a parallax between an image area for specifying a light source color of the first image and an image area for specifying a light source color of the second image is eliminated;
a comparison step of comparing the pixel signal of the first image and the pixel signal of the second image, subjected to the position adjustment in the position adjustment step; and
a light source color specifying step of specifying the light source color on the basis of a result of the comparison performed in the comparison step,
wherein the comparing step includes obtaining a difference value between the pixel signal of the first image and the pixel signal of the second image, and the light source color specifying step is arranged to specify the light source color on the basis of the difference value in the image areas between which there is no parallax due to the position adjustment by the position adjustment unit,
wherein the obtaining step includes obtaining information of in-focus ranges of the first image and the second image, and the light source color specifying step is arranged to specify the light source color on the basis of the information of the in-focus ranges, and
wherein the comparing step compares the pixel signals of the first and second image of a same spectrum characteristic.

5. A non-transitory computer-readable storage medium storing a program comprising a program code for causing a computer to execute the image processing method according to claim 4.

* * * * *